Figure 1:
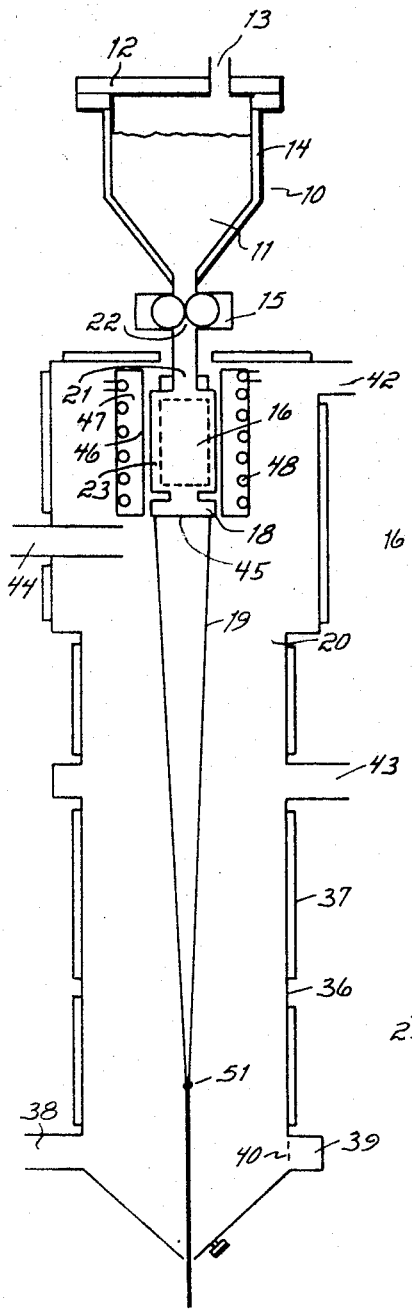
Figure 2:
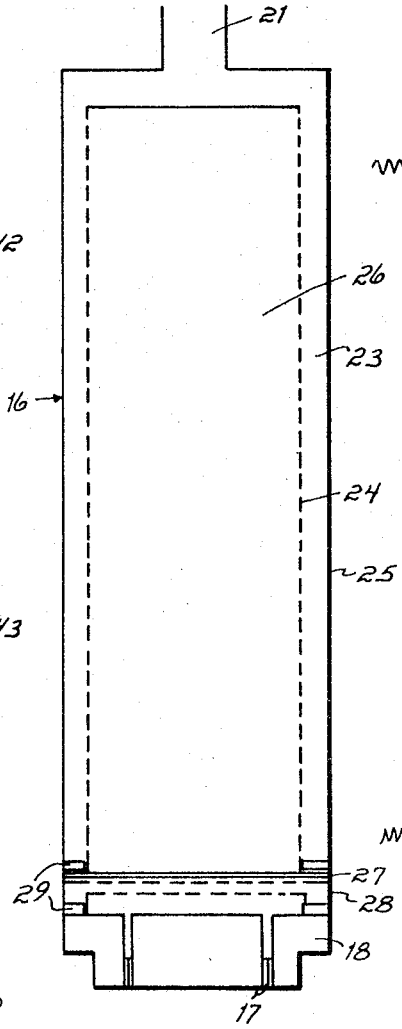
Figure 3:
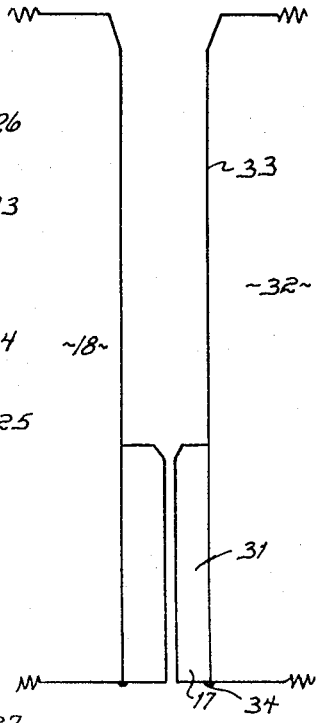
Figure 4:
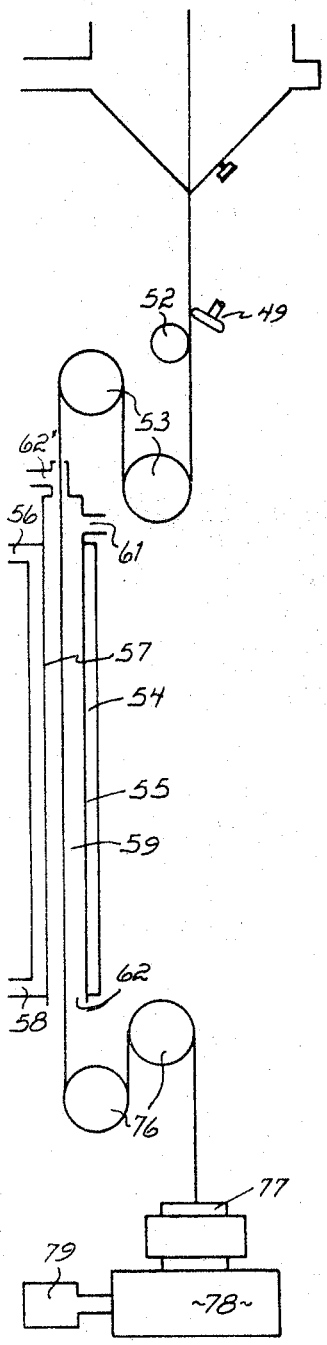
Figure 7:
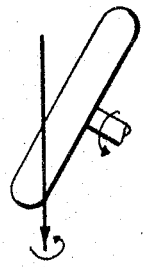
Figure 5:
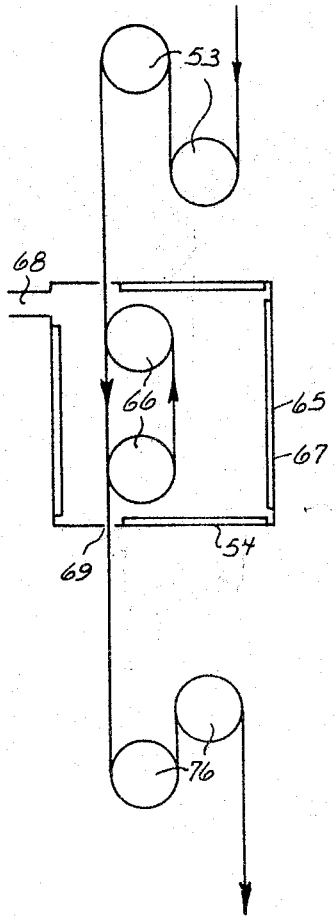
Figure 6:
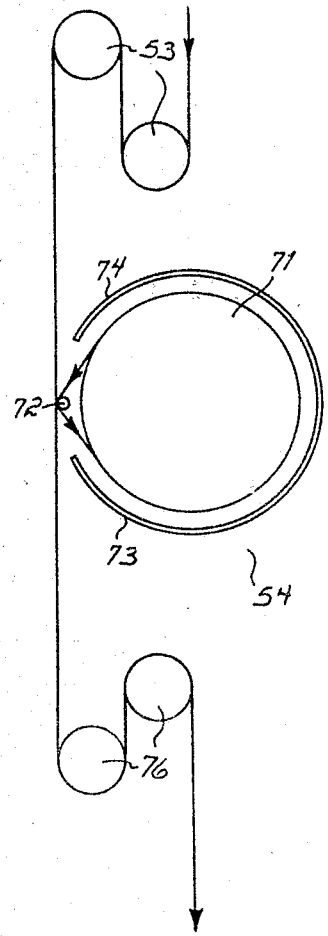

T862015

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 27, 1969

862 O.G. 1009

802,748

PROCESS FOR MANUFACTURING SPANDEX TYPE YARN

Emmett V. Martin and Colquitt H. Chapman, both of P.O. Box 511, Kingsport, Tenn. 37662

Continuation of application Ser. No. 656,716, July 28, 1967. This application Feb. 17, 1969. Published May 27, 1969

Int. Cl. D01d *5/12;* D01f *7/06;* D02g *3/32*

U.S. Cl. 264—205

2 Sheets Drawing. 29 Pages Specification

A process is disclosed for manufacturing spandex yarn which includes extruding a spinning dope of segmented elastomer through a spinneret plate having a plurality of orifices having a length to diameter ratio of 5 to 200, causing an air stream, preferably at a temperature of from 25° C. to 150° C., to flow across the face of the spinneret plate as the dope is extruded therethrough, and then curing the bundle of filaments thereby obtained by contacting the bundle with a hot gaseous medium which may be at a temperature of from 150° C. to 300° C. The bundle of filaments also may be coalesced into a multifilament yarn and may be heat treated at a temperature of from 50° C. to 250° C., preferably 120° C. to 180° C., at an exposure time of 0.02 second to 24 hours, preferably 0.1 second to 1 minute, while stretching said yarn from about 1.1 to about 6.0 times, preferably 1.25 to 4.50 times. The spandex yarn properties may be improved by exposing it to a water medium, for example, a controlled atmosphere between about 40% and about 75% relative humidity at a temperature between about 20° C. and about 75° C.

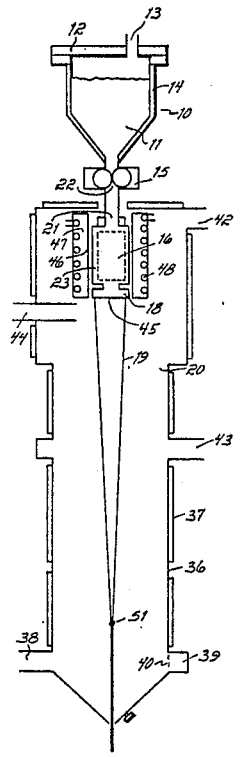

T862015

SN - 802748

May 27, 1969 E. V. MARTIN ET AL DEF. PUB.

PROCESS FOR MANUFACTURING SPANDEX TYPE YARN

Filed Feb. 17, 1969 Sheet 1 of 2

COLQUITT H. CHAPMAN
EMMETT V. MARTIN
INVENTORS

BY William T. French
Charles L. Good
ATTORNEYS

T862015

SN - 802748

May 27, 1969 E. V. MARTIN ET AL DEF. PUB.

PROCESS FOR MANUFACTURING SPANDEX TYPE YARN

Filed Feb. 17, 1969 Sheet 2 of 2

COLQUITT H. CHAPMAN
EMMETT V. MARTIN
INVENTORS

BY William T. French
Charles L. Good
ATTORNEYS